United States Patent [19]
Jahn

[11] Patent Number: 5,809,770
[45] Date of Patent: Sep. 22, 1998

[54] SILENCER FOR A GAS FLOW

[75] Inventor: Darrell D. Jahn, Shakopee, Minn.

[73] Assignee: Donaldson Company, Inc., Minneapolis, Minn.

[21] Appl. No.: 508,755

[22] Filed: Jul. 31, 1995

[51] Int. Cl.$^6$ ................................................ F02C 7/045
[52] U.S. Cl. ........................ 60/39.33; 181/214; 415/119
[58] Field of Search ........................... 60/39.33; 415/119; 181/214, 218, 222, 239, 240

Primary Examiner—Louis J. Casaregola
Attorney, Agent, or Firm—Merchant, Gould, Smith, Edell, Welter & Schmidt, P.A.

[57] ABSTRACT

A silencer for reducing the noise emitted by the venting of a gas flow includes a tubular gas flow member having a sidewall, an open first end for connection to a gas supply, a closed second end and an opening in the sidewall for passage of gas from the interior of the gas flow member. The tubular gas flow member is surrounded by a porous noise-reducing member at least at the location of the opening in the sidewall of the gas flow member. A shell surrounds the noise-reducing member, and is provided with an opening for passage of gas which is spaced circumferentially from the opening in the sidewall of the gas flow member. In one embodiment, the noise-reducing member can be a wire mesh which is wrapped around the tubular gas flow member.

28 Claims, 6 Drawing Sheets

SILENCER FOR A GAS FLOW

BACKGROUND OF THE INVENTION

The present invention is directed to a silencer for a gas flow. That is, the present invention is directed to a device which reduces noise generated when a high pressure gaseous fluid is expanded to ambient pressure. In addition, the present invention permits the fluid discharge to be directed in a desired manner.

The release of a gas from a pressurized gas source through an apertured pipe has many industrial uses. One example is in the field of gas turbines, for example used for the generation of electricity. It has been found to be desirable to provide preheating for the inlet air being admitted to the turbine, for example for preventing ice buildup on air intakes and filters during cold weather operation. To this end, a "bleeder" line has been used to connect the turbine with the air inlet system. Thus, a small amount of hot gas from the turbine is supplied under pressure to the air inlet through an appropriate system of pipes. Apertured pipes are used to release the heated, pressurized gas at the air inlet.

While this system has been useful, the release of the gas through the apertured pipes results in an objectionable, high-pitched whine, and in fact, the emitted noise is so significant that the apertured pipes have come to be known as "piccolo" tubes. The noise creates an unpleasant environment for workers and those living or working near such facilities.

Previous efforts to reduce the noise generated from the escape of the gas from the apertured pipes have suffered from air flow distribution problems and high installation costs. See U.S. Pat. Nos. 5,166,479, 3,960,239 and 3,949,828.

SUMMARY OF THE INVENTION

The present invention provides a silencer for a gas flow which is effective for reducing the noise generated by an apertured pipe while maintaining desired gas flow characteristics. The silencer of the present invention is easily and economically produced and installed, and is suitable for retrofit applications.

The silencer for a gas flow of the present invention comprises a tubular gas flow member having a sidewall, an open first end for connection to a gas supply, a closed second end, and at least one opening in the sidewall for passage of gas from the interior of the gas flow member. A porous, noise-reducing member surrounds the tubular gas flow member at least at the location of the first opening in the sidewall. The noise-reducing member is in turn surrounded by a shell which is essentially fluid-tightly secured to the tubular gas flow member. The shell is provided with a second opening for passage of gas which has passed through the opening in the sidewall of the tubular gas flow member. The opening of the tubular gas flow member and the opening of the shell are spaced circumferentially from each other sufficiently so that the gas escaping through the opening in the sidewall of the tubular gas flow member is forced to pass through the noise-reducing member to reach the opening in the shell.

DETAILED DESCRIPTION OF THE INVENTION

Figure 1:
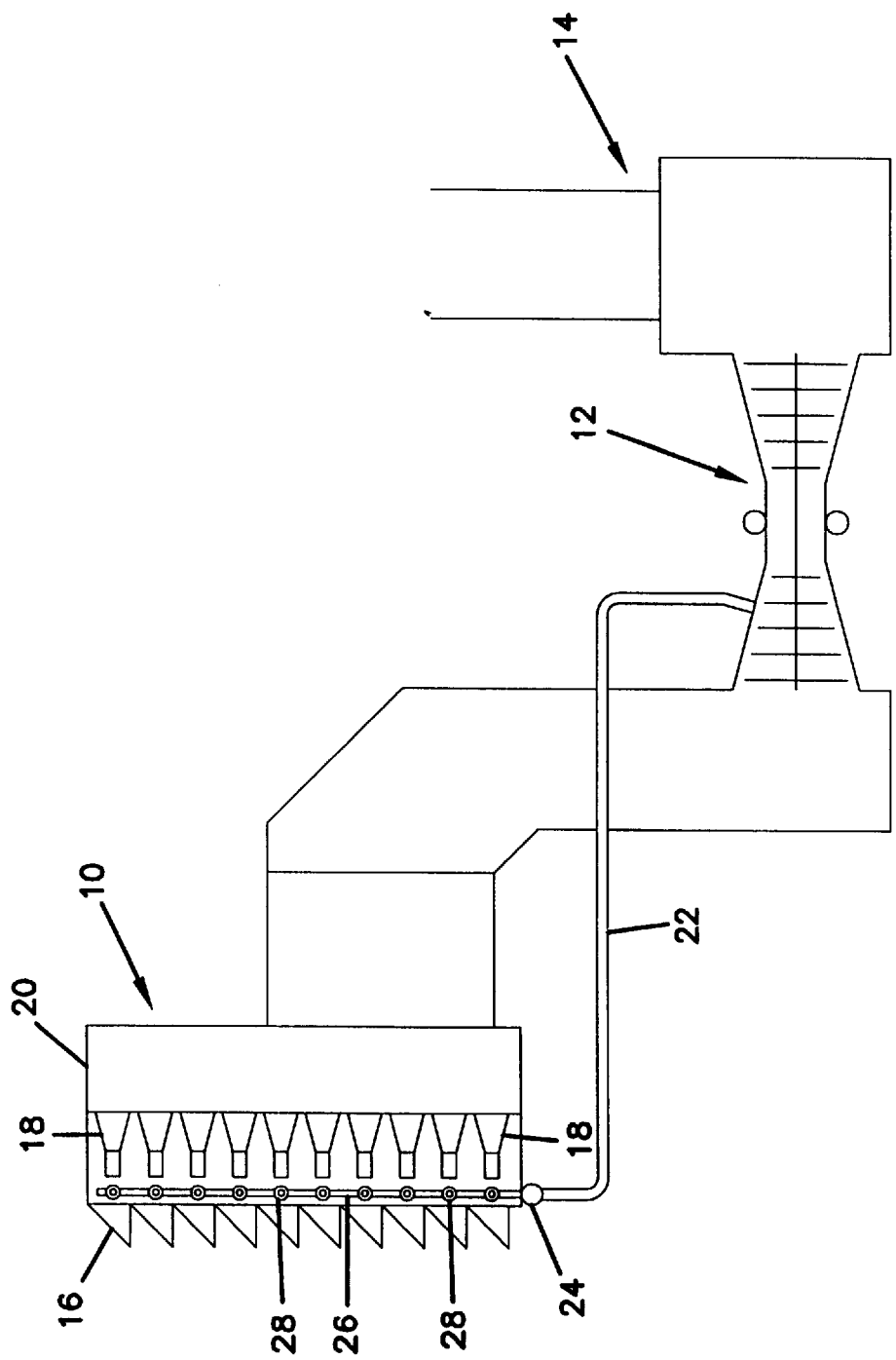
FIG. 1 is a schematic side view of a gas turbine system with which the present silencer for a gas flow can be used.
Figure 2:
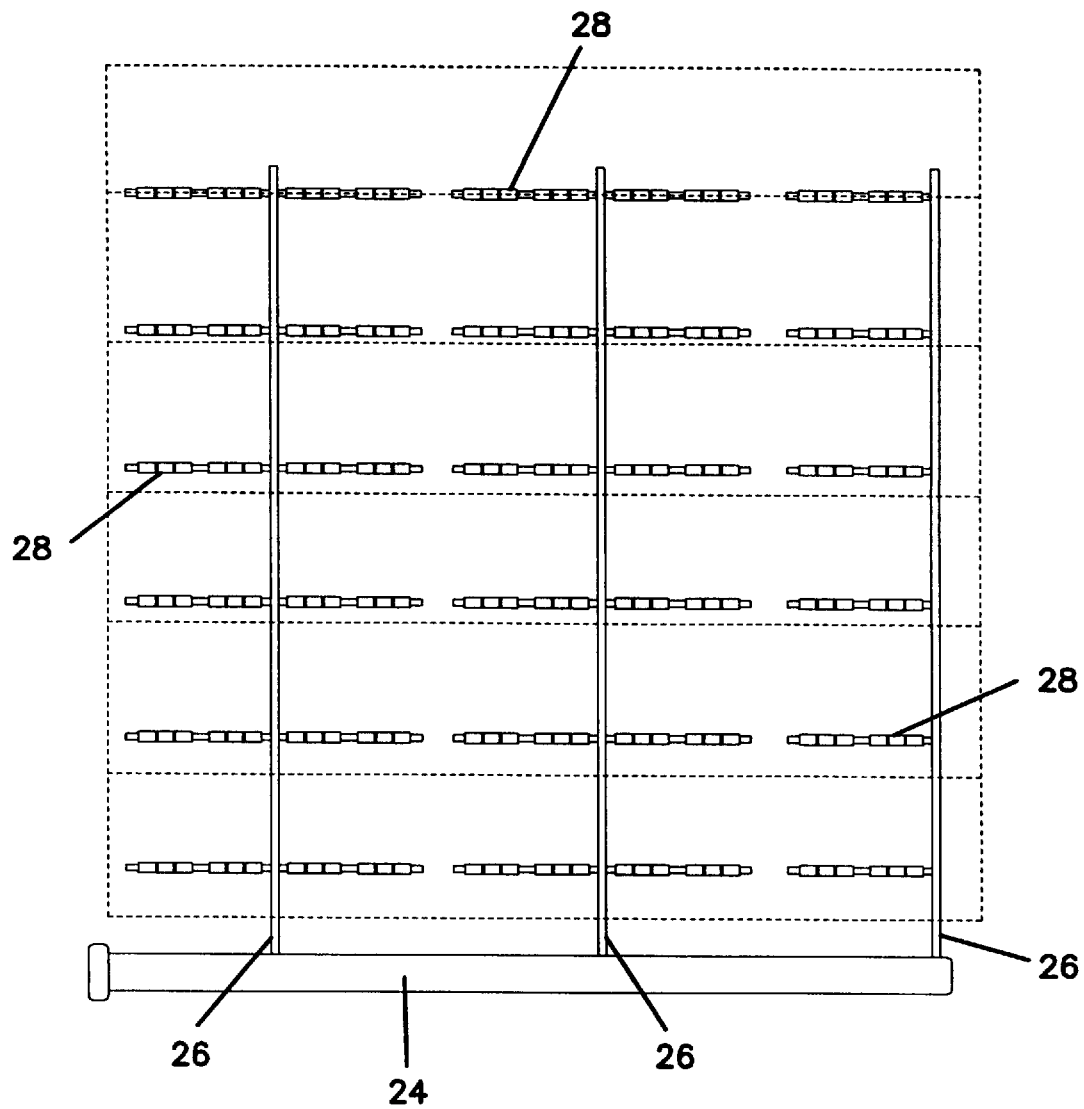
FIG. 2 is an end view of the air inlet of FIG. 1.

Referring to FIGS. 1 and 2, an example of one application where the silencer of the present invention will be described, namely use in a gas turbine system. The turbine system generally includes air inlet 10, the turbine 12 and air outlet 14. The air inlet in turn can include components such as a rain hood 16 and an insect grill for preventing precipitation, insects and environmental debris from entering the turbine system. The inlet air passes through air filters 18 to plenum 20 and from there to the turbine 12.

In order to preheat the inlet air, a bleeder line 22 extends from the turbine to the air inlet. As can be seen in FIG. 2, the heated air under pressure from the turbine is passed from the bleeder line to supply pipe 24, and then to header tubes 26. The air is then released from the header tubes through the silencers 28 of the present invention in a manner discussed in more detail below.

Figure 3:
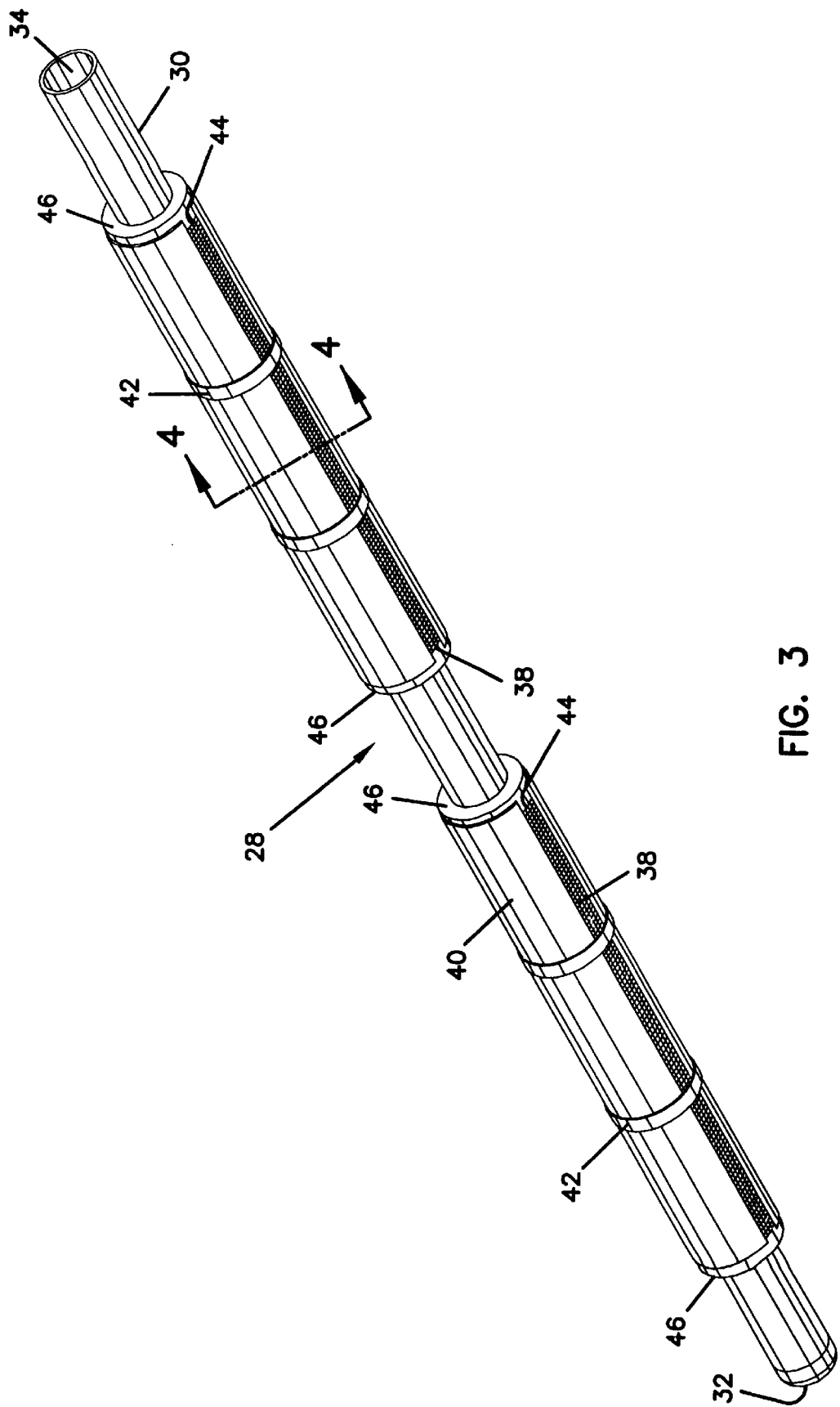
FIG. 3 is a perspective view of the silencer for a gas flow of the present invention.
Figure 4:
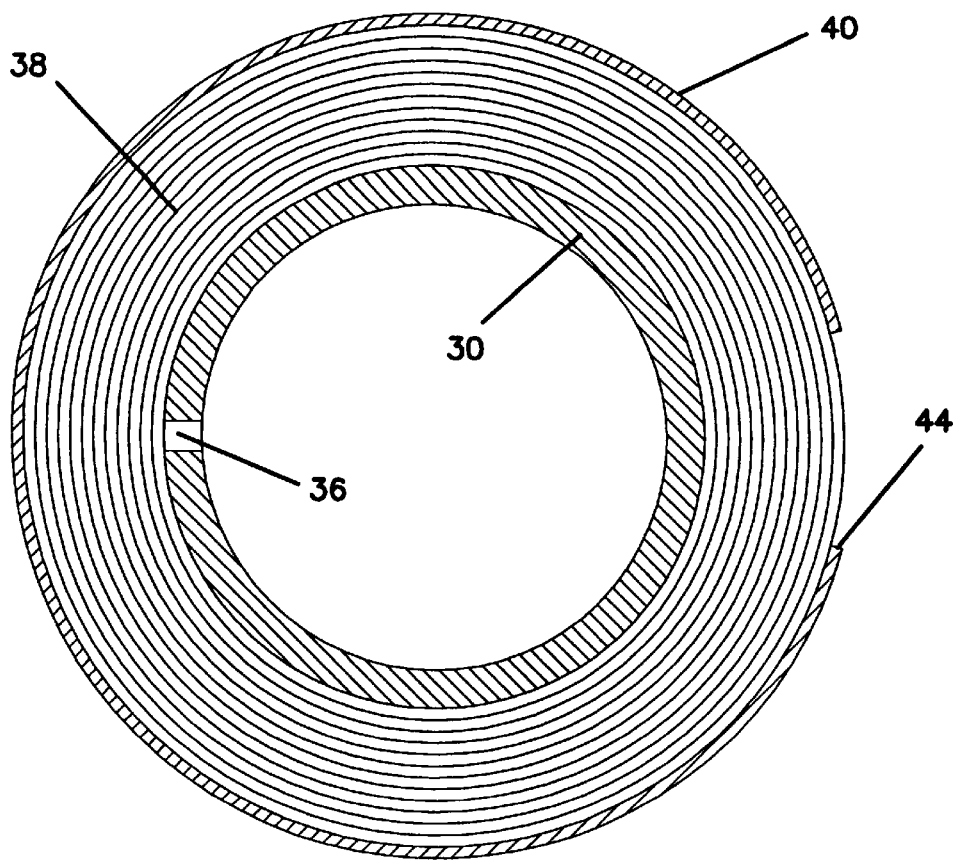
FIG. 4 is a sectional side view of the silencer of FIG. 3.

Referring to FIGS. 3 and 4, the silencer 28 of the present invention includes three principle components, tubular gas flow member 30, noise-reducing member 38 and shell 40. The tubular gas flow member 30 has a closed end 32 and an open end 34. In the application illustrated in FIGS. 1 and 2, the open end 34 of the tubular gas flow member 30 is in fluid communication with header tube 26, for accepting gas flow passing from turbine 12 through bleeder line 22, supply pipe 24 and the header tube. In the case of gas turbine systems, the gas supplied to the tubular gas flow member will generally be under a pressure of about 70 to 200 psi gauge.

The noise-reducing member is a highly porous material which surrounds the sidewall of the tubular gas flow member at least in the area of openings 36. The porosity of the noise-reducing member is desirably at least 75%, preferably at least about 85%. The porosity is determined by the formula {1-(weight of the member/weight of the same volume of solid material)}×100. In one embodiment, the noise-reducing member can be made of wire mesh which is wrapped around the tubular gas flow member, with a porosity of 87.5%. The noise-reducing member can be made of other materials satisfying the physical requirements of the conditions of use, for example metal and ceramic sponges having the desired porosity. The mesh is preferred for many uses because it is easy to handle and permits ready customization of products, i.e. the noise reduction can be tailored to specific needs by increasing or decreasing the number of layers in the wrap.

Shell 40 surrounds the noise-reducing member 38. In a preferred embodiment, the shell 40 is formed from a single, thin rectangular sheet which is wrapped around the noise-reducing member. For example, the shell may be formed from a 16 gauge stainless steel sheet. In this embodiment, the sheet can be held in the desired configuration with straps 42. Advantageously, these straps can be similar to the clamps used to hold rubber hose in place. Alternatively, welding or a buckle-type system can be used. End plates 46 are used to seal between the tubular gas flow member 30 and the shell 40. It is preferred that, at one end of the shell, the end plate 46 is fixed both to the shell and the tubular gas flow member, while at the other end of the shell the end plate is secured only to the shell. This permits a small amount of relative movement between the shell and end plate combination and the tubular gas flow member, to accommodate expansion and contraction of the materials. The seal between the end plate and the tubular gas flow member and between the end plate and the shell should be essentially fluid-tight. That is, while it may be uneconomic or practically impossible to provide a seal which is absolutely fluid-tight, the seal should be fluid-tight within the limits of practicality.

Opening 44 permits the discharge of gas from the interior of the shell 40. In the illustrated embodiment, the discharge opening 44 is defined by the facing edges of the rectangular sheet which is used to form the shell 40. That is, the width of the sheet used to form shell 40 is selected so that the edges will not meet when the sheet is wrapped around the noise-reducing member 38, thereby leaving a longitudinal slot through which gas can escape.

In order to force gas from the interior of the tubular gas flow member 30 to pass through noise-reducing member 38 before it is released through the opening 44 in shell 40, the opening 36 in the sidewall of the tubular gas flow member should be circumferentially misaligned with the opening 44 in the shell. Thus, as gas exits from the tubular gas flow member into the noise-reducing member, it is confined by shell 40 until it reaches opening 44, passing through the noise-reducing material the entire time. The gas is virtually fully expanded by the time it reaches the opening 44, with the large majority of expansion taking place after passage through the openings 36 but before reaching opening 44.

It is preferred that the openings 36 and 44 be separated circumferentially by an angular distance of at least 90°, this spacing being based upon the centers of the openings. In the embodiment illustrated in FIG. 4, the spacing is 180°. While the opening 44 in the shell can be made in any desired configuration, the formation of the opening as a longitudinal slot is advantageous since it allows the size of the opening to be maximized while maintaining the largest possible distance from the openings 36 in the tubular gas flow member.

Figure 5:
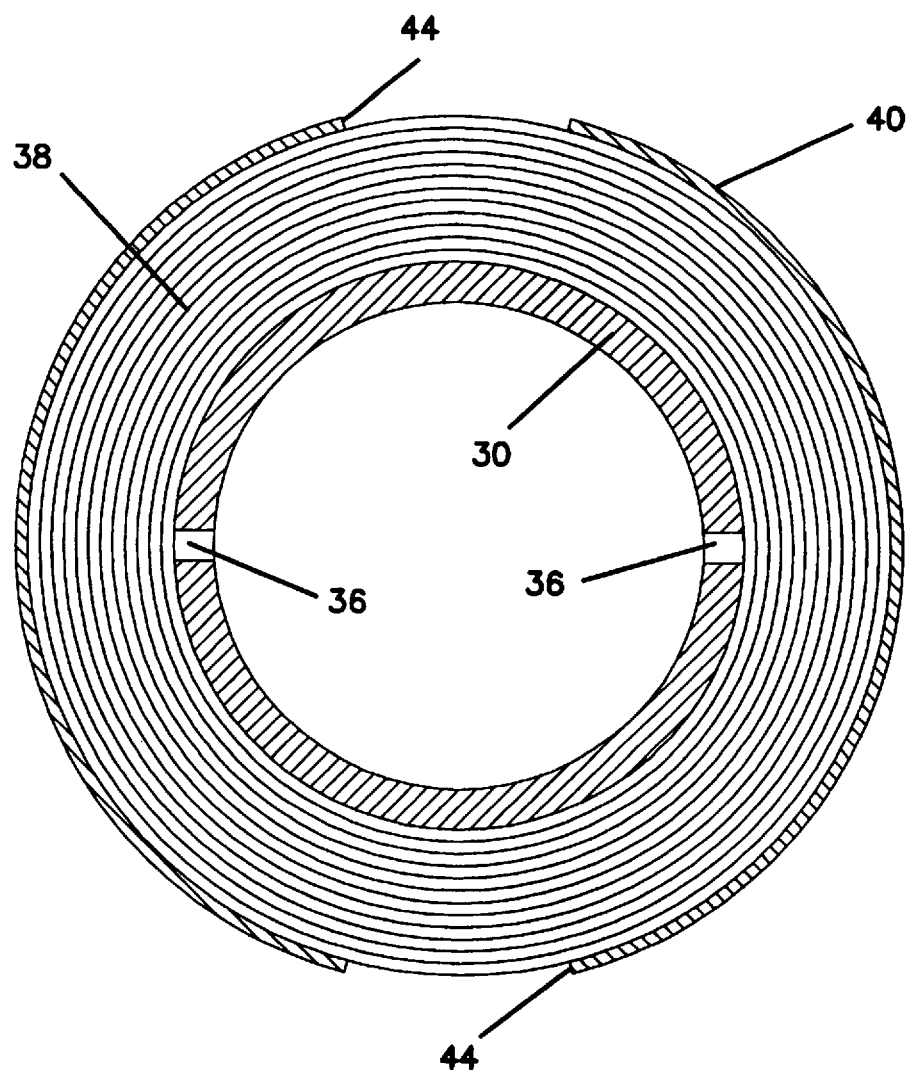
FIG. 5 is a sectional view similar to FIG. 4 of a further embodiment of the present invention.

In the embodiment of FIG. 5, the tubular gas flow member is provided with diametrically opposed openings 36, and the shell is provided with diametrically opposed openings 44. It can be seen that this arrangement of openings maintains a circumferential spacing of at least 90° between the openings 36 and 44 (again based on centers). This arrangement may be advantageous in some applications since it can reduce the total number of silencers needed for a given installation. For example, the number of silencers 28 in FIG. 2 would be reduced. In addition, in some cases the passage of gas over the wires in a wire mesh noise-reducing member may tend to regenerate noise. The embodiment of FIG. 5 will have reduced gas velocity in the noise-reducing member, which lessens the possibility of noise regeneration.

As can be seen in FIG. 3, it is possible to provide one tubular gas flow member 30 with several groups of openings in its sidewall, with each group of openings having its own associated noise-reducing member 38 and shell 40. In the embodiment of FIG. 3, there are two such groups. Generally, each group will include from 3 to 12 openings, depending on the specific application in question. The openings will usually be arranged linearly, although a staggered arrangement would be acceptable, keeping in mind that each of the openings should be spaced a circumferential distance of at least 90 degrees from the opening in the shell.

The thickness of the layer of the noise-reducing member 38 will depend upon the specific application and the desired amount of noise reduction. In the case of a silencer for use in the gas turbine system described above, the ratio of the inside cross-sectional area of the tubular gas flow member 30 to the cross-sectional area of the noise-reducing member 38 may range from 1:1 to 1:10, with 1:2 to 1:6 being the range normally used. Again, in the illustrated gas turbine system, the length of the silencer 28 illustrated in FIG. 3 will be nearly 7 feet long. The outer diameter of the tubular gas flow member 30 will be about 2.375 inches and the inner diameter of shell 40 is about 4.5 inches, with the difference reflecting the thickness of the noise-reducing member 38, in this example slightly more than 1 inch. In the case of the gas turbine system, it is desired to reduce the noise level to less than 85 decibels at a distance of 3 feet from the air inlet.

The size of the openings 36 and 44 will depend upon the desired air flow and the desired noise reduction. In the illustrated gas turbine system, the openings 36 can be circular and have a diameter in the range of about 0.08 inch to 0.5 inch, for example about $11/64$ inch. This will maintain pressure in the tubular gas flow member at 30 psi gauge or more to provide a sonic flow, which maximizes the gas flow and prevents the upstream passage of noise. In this case, the opening 44 is about 1.5 inches wide.

Generally, the area of the opening 44 will be about 75 to 2000 times the total area of the openings 36 in the tubular gas flow member, depending on temperature and pressure. For most gas turbine systems, the area of the opening 44 will be about 200 times greater than the total area of the openings 36. In any event, the width of the opening 44 in circumferential terms should not be greater than 90°. If the opening 44 is too narrow, the opening 44 itself will regenerate noise. If the opening 44 is too wide, inadequate noise reduction may result.

Figure 6:
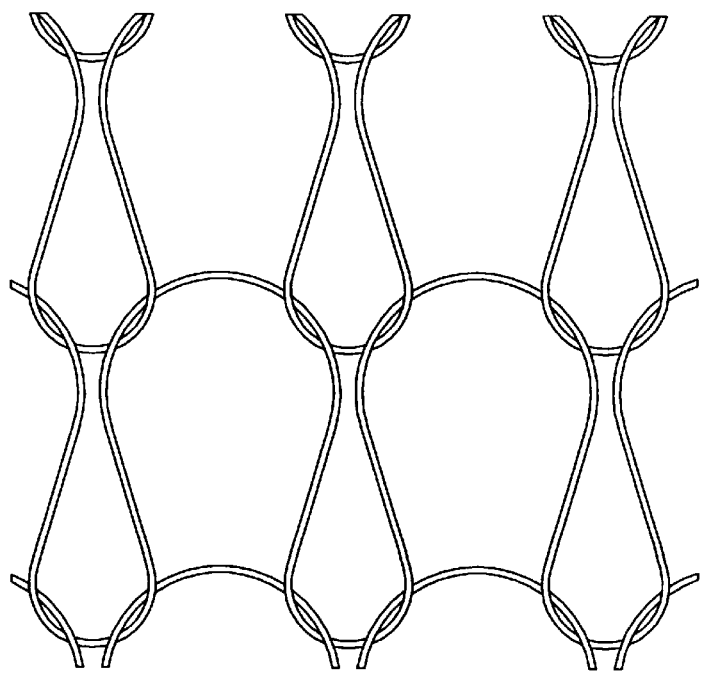
FIGS. 6 through 8 are views illustrating various mesh patterns which can be used for the noise-reducing material used with the silencer of the present invention.
Figure 7:
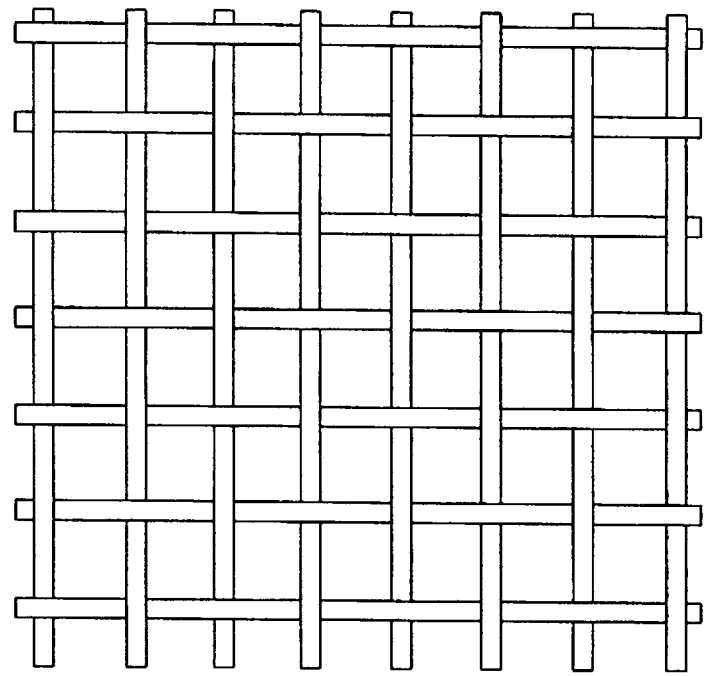
Figure 8:
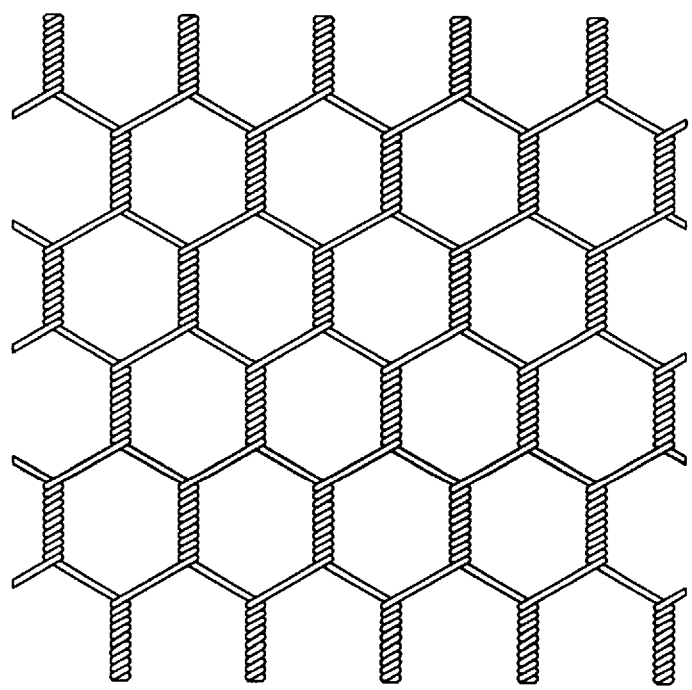

The materials used for the silencer of the present invention will depend upon the intended operating environment. The present invention can be used over wide ranges of temperature and pressure. For example, the temperature may range from −50° to 1500° F., more particularly ambient to 800° F. The pressure can range up to several thousand psig, normally about 15–500 psig. In the case of the gas turbine application described above, stainless steel, particularly 304 or 304L stainless steel, is a preferred material for the tubular gas flow member and the shell in view of the relatively high temperatures involved. Other metals or ceramics can be used as desired. In this case, the noise-reducing member 38 is formed from a stainless steel wire mesh. One example is a knitted, 100 density wire mesh formed from 0.011 inch diameter 304 stainless steel wire, available from Metex of Edison, N.J. While the knit pattern for the mesh illustrated in FIG. 6 is particularly useful, other patterns could be used as well, including the woven pattern of FIG. 7 or the hexagonal "chicken wire" pattern of FIG. 8. In some cases, the knit or woven mesh will be produced in a tubular form. In such a case, it is not necessary to "open" the tube to apply the mesh to the tubular gas flow member for the purposes of the present invention. The mesh tube can be wrapped as a double layer in a flattened condition.

When wire mesh is applied to the tubular gas flow member as the noise-reducing member, the inner end of the mesh, i.e. the end adjacent the tubular gas flow member, need only be secured to the tubular gas flow member sufficiently to hold the mesh in place during wrapping. Adhesive tape or suitable adhesives can be used for this purpose. The wrapping itself generally will be sufficient to hold the inner end in place during use. However, the outer end of the mesh, i.e. the end adjacent the shell, should be secured more firmly. In the case of metal wire mesh, this can be done by the use of a suitable number of hog rings, or by stitching the outer end to the underlying layers, for example with stainless steel wire. In addition, it is preferred to have the outer end of the mesh at a circumferentially remote position with respect to opening 44, preferably at least 90°, so that if the outer end happens to come loose, the chances of it escaping through opening 44 are lessened.

Again, in the gas turbine system application for the present silencer, the tubular gas flow member 30 can have end 32 closed with a stainless steel end cap. Similarly, the end plate 46 can be made of stainless steel, as can the straps 42.

It can be seen that the present invention provides a silencer for a gas flow which is readily adaptable to many applications, provides excellent control for the air flow, can be installed easily and economically, and which is useful for either new or retrofit construction. While the present silencer has been illustrated in connection with a gas turbine system, it will be understood that it can be used in any application in which air or any other gaseous fluid is being vented to a reduced pressure through a relatively thin pipe. While a detailed description of the invention has been provided above, the present invention is not limited thereto, and further modifications will be apparent to those skilled in the art. Rather, the invention is defined by the following claims.

What is claimed is:

1. A silencer for a gas flow, comprising:
   a tubular gas flow member having a sidewall, an open first end for connection to a gas supply and a closed second end, the sidewall being provided with a first opening for passage of gas from the interior of the gas flow member;
   a porous, noise-reducing member surrounding the tubular gas flow member at least at the location of the first opening in the sidewall; and
   a shell surrounding the noise-reducing member, essentially fluid-tightly secured to the tubular gas flow member, provided with a second opening for passage of gas which has passed though the first opening;
   the first opening being spaced circumferentially from the second opening sufficiently so that gas passing through said first opening is forced to pass through the noise-reducing member to reach the second opening, the second opening extending substantially the length of the shell.

2. The silencer of claim 1, wherein the first and second openings are spaced apart circumferentially by an angular distance of at least 90 degrees.

3. The silencer of claim 1, wherein the noise-reducing member comprises a wire mesh which is wrapped around the tubular gas flow member.

4. The silencer of claim 1, wherein the sidewall of the tubular gas flow member is provided with a plurality of first openings, arranged into at least two groups, with one porous, noise-reducing member being provided for each of the groups of first openings, the noise-reducing members being longitudinally separated from each other.

5. The silencer of claim 4, wherein one shell is provided for each of the noise-reducing members, the shells being longitudinally separated from each other.

6. The silencer of claim 1, wherein the shell has first and second ends, the silencer further comprising first and second plates disposed at the first and second ends of the shell for substantially fluid-tightly sealing the shell to the tubular gas flow member.

7. The silencer of claim 6, wherein the first plate is fixed to the tubular gas flow member and relative movement is permitted between the second plate and the tubular gas flow member.

8. The silencer of claim 1, wherein the second opening extends substantially the length of the shell.

9. The silencer of claim 8, wherein the shell is in the form of a sheet wrapped around the noise-reducing member, and the second opening is formed by a gap between facing edges of the sheet.

10. The silencer of claim 1, wherein the noise-reducing member has a porosity of at least about 75%.

11. The silencer of claim 10, wherein the noise-reducing member has a porosity of at least 85%.

12. The silencer of claim 3, wherein the wire mesh is in the form of a flattened tube which is wrapped around the tubular gas flow member.

13. A silencer for a gas turbine system, comprising:
   a tubular gas flow member having a sidewall, an open first end for receiving a flow of pressurized hot gas from a gas turbine, and a closed second end, the sidewall being provided with a plurality of first openings for passage of gas from the interior of the gas flow member;
   a porous, noise-reducing member surrounding the tubular gas flow member, in the form of a wire mesh wrapped around the tubular gas flow member at least at the location of the first openings in the sidewall, having a porosity of at least 75%; and
   a sheet wrapped around the noise-reducing member to form a shell having first and second ends, the shell being essentially fluid-tightly secured to the tubular gas flow member by means of first and second plates disposed at the first and second ends of the shell, the shell being provided with a second opening which extends substantially the length of the shell, formed by a gap between facing edges of the sheet, for directing gas which has passed through the first openings toward an air inlet of a gas turbine system;
   the first openings being spaced circumferentially from the second opening by an angular distance of at least 90 degrees so that gas passing through said first openings is forced to pass through the noise-reducing member to reach the second opening, the second opening having an area which is about 75 to 2000 times greater than the total area of the first openings.

14. The silencer of claim 13, wherein the first openings are arranged as at least two groups, with one noise-reducing member being provided for each of the groups of first openings, the noise-reducing members being longitudinally separated from each other.

15. The silencer of claim 14, wherein one shell is provided for each of the noise-reducing members, the shells being longitudinally separated from each other.

16. The silencer of claim 13, wherein the first plate is fixed to the tubular gas flow member and relative movement is permitted between the second plate and the tubular gas flow member.

17. The silencer of claim 13, wherein the wire mesh is in the form of a flattened tube which is wrapped around the tubular gas flow member.

18. A gas ejection system, comprising:
   a source of a pressurized gas flow;
   a silencer according to claim 1; and
   a gas supply system in fluid communication with the source of pressurized gas flow and the silencer according to claim 1 for supplying gas under pressure to the silencer.

19. The gas ejection system of claim 18, wherein the gas supply system comprises a supply pipe in fluid communication with the source of pressurized gas flow, and a header pipe in fluid communication with the supply pipe, the silencer being connected to the header pipe.

20. A gas turbine system, comprising:

a turbine;

an air inlet housing for supplying air to the turbine; and a gas ejection system according to claim 18, wherein the turbine is the source of a pressurized gas flow, and the silencer is disposed in the air inlet housing.

21. The gas turbine system according to claim 20, wherein the gas supply system comprises a supply pipe in fluid communication with the source of pressurized gas flow, and a header pipe in fluid communication with the supply pipe, the silencer being connected to the header pipe, the header pipe and the silencer being disposed in the air inlet housing.

22. A silencer for a gas flow, comprising:

a tubular gas flow member having a sidewall, an open first end for connection to a gas supply and a closed second end, the sidewall being provided with a first opening for passage of gas from the interior of the gas flow member;

a porous, noise-reducing member surrounding the tubular gas flow member at least at the location of the first opening in the sidewall; and a shell surrounding the noise-reducing member, essentially fluid-tightly secured to the tubular gas flow member, provided with a second opening for passage of gas which has passed though the first opening;

the first opening being spaced circumferentially from the second opening sufficiently so that gas passing through said first opening is forced to pass through the noise-reducing member to reach the second opening, wherein the sidewall of the tubular gas flow member is provided with a plurality of first openings, arranged into at least two groups, with one porous, noise-reducing member being provided for each of the groups of first openings, the noise-reducing members being longitudinally separated from each other.

23. The silencer of claim 22, wherein the first and second openings are spaced apart circumferentially by an angular distance of at least 90 degrees.

24. The silencer of claim 22, wherein one shell is provided for each of the noise-reducing members, the shells being longitudinally separated from each other.

25. The silencer of claim 22, wherein the shell has first and second ends, the silencer further comprising first and second plates disposed at the first and second ends of the shell for substantially fluid-tightly sealing the shell to the tubular gas flow member.

26. The silencer of claim 25, wherein the first plate is fixed to the tubular gas flow member and relative movement is permitted between the second plate and the tubular gas flow member.

27. The silencer of claim 22, wherein the noise-reducing member has a porosity of at least 75%.

28. The silencer of claim 27, wherein the noise-reducing member has a porosity of at least 85%.

* * * * *